United States Patent
Milizia et al.

(10) Patent No.: US 10,519,275 B2
(45) Date of Patent: Dec. 31, 2019

(54) POLYESTERS COMPRISING 2-METHYLGLUTARIC ACID, PROCESS FOR PRODUCTION OF THE SAID POLYESTERS AND PRODUCTS OBTAINED THEREWITH

(71) Applicant: Novamont S.p.A., Novara (IT)

(72) Inventors: Tiziana Milizia, Novara (IT); Roberto Vallero, Borgo d'Ale (IT)

(73) Assignee: NOVAMONT S.P.A., Novara (IT)

(*) Notice: Subject to any disclaimer, the term of this patent is extended or adjusted under 35 U.S.C. 154(b) by 609 days.

(21) Appl. No.: 14/391,565

(22) PCT Filed: Apr. 11, 2013

(86) PCT No.: PCT/EP2013/057556
§ 371 (c)(1),
(2) Date: Oct. 9, 2014

(87) PCT Pub. No.: WO2013/153147
PCT Pub. Date: Oct. 17, 2013

(65) Prior Publication Data
US 2015/0079867 A1    Mar. 19, 2015

(30) Foreign Application Priority Data
Apr. 11, 2012 (IT) .............. MI2012A0582

(51) Int. Cl.
| | |
|---|---|
| *C08G 63/183* | (2006.01) |
| *C08L 67/02* | (2006.01) |
| *C08G 63/16* | (2006.01) |
| *C08G 63/181* | (2006.01) |

(52) U.S. Cl.
CPC ........... *C08G 63/183* (2013.01); *C08G 63/16* (2013.01); *C08G 63/181* (2013.01); *C08L 67/02* (2013.01); *Y10T 442/60* (2015.04)

(58) Field of Classification Search
CPC ........ C08L 67/02; C08L 101/00; C08L 67/04; C08G 63/16; C08G 63/181; C08G 63/183; Y10T 442/60
See application file for complete search history.

(56) References Cited

U.S. PATENT DOCUMENTS

| | | |
|---|---|---|
| 4,778,830 A | 10/1988 | Streu et al. |
| 2005/0208291 A1 | 9/2005 | Kaufman et al. |
| 2011/0039999 A1 | 2/2011 | Witt et al. |

*Primary Examiner* — Ling Siu Choi
*Assistant Examiner* — Gennadiy Mesh
(74) *Attorney, Agent, or Firm* — Polsinelli PC

(57) ABSTRACT

Provided are polyesters selected from i) aliphatic polyesters wherein the dicarboxylic component and the diolic component are both aliphatic, the aliphatic dicarboxylic component comprising at least 20% by moles of 2-methylglutaric acid and up to 80% by moles of at least one second linear aliphatic saturated diacid; and ii) aliphatic-aromatic polyesters having a dicarboxylic component comprising repeating units deriving from at least one polyfunctional aromatic acid and at least one aliphatic diacid, and a diol component comprising repeating units deriving from at least one aliphatic diol, wherein said aliphatic diacid comprises a mixture consisting of at least 30% by moles of 2-methylglutaric acid and up to 70% by moles, with respect to the total moles of the aliphatic dicarboxylic component, of at least one second linear aliphatic saturated aliphatic diacids; and processes for production thereof. The polyesters have great toughness and high elongation at failure values.

8 Claims, No Drawings

POLYESTERS COMPRISING 2-METHYLGLUTARIC ACID, PROCESS FOR PRODUCTION OF THE SAID POLYESTERS AND PRODUCTS OBTAINED THEREWITH

CROSS REFERENCE TO RELATED APPLICATIONS

This application is a National Phase filing under 35 U.S.C. § 371 of PCT/EP2013/057556 filed on Apr. 11, 2013; and this application claims priority to Application No. MI2012A000582 filed in Italy on Apr. 11, 2012 under 35 U.S.C. § 119. The entire contents of each application is hereby incorporated by reference.

This invention relates to a polyester which is characterised by noteworthy workability properties even when mixed with other polymers and is capable of being converted into products such as for example films, fibres, non-woven fabrics, sheets, moulded articles and thermoformed, blow-moulded and expanded products characterised by improved toughness associated to higher elongation at failure values with respect to other polyesters of the same type. This invention also relates to a process for the production of these polyesters.

Over the years polymer materials have become increasingly widespread because of their versatility, their ability to be easily worked and their low cost.

For example, among thermoplastic polymer materials the development of new polyesters has been particularly important. This type of polymer material has in fact found substantial application in the field of fibres, moulded and blow-moulded articles and films.

The increasing use of polymer materials in increasingly technologically advanced application sectors however requires continuous development of new materials capable of ensuring increasingly higher performance in use.

In the sector of thermoplastic polyesters for the production of packaging films, for example, one of the greatest difficulties is that of obtaining products characterised by a good balance between toughness and deformability properties without detriment to the capacity of withstanding high loads.

The problem underlying this invention is therefore that of finding a new polymer capable of ensuring high performance in use for the products obtained therewith, and in particular a good balance between toughness and deformability properties without detriment to the capacity of withstanding high loads.

Starting from this problem it has been surprisingly found that by suitably selecting the type of monomers it is possible to obtain a polyester having the properties mentioned above.

In particular this invention relates to polyesters comprising repetitive units comprising a dicarboxylic component and a diol component, in which the dicarboxylic component comprises 2-methylglutaric acid.

It has in fact been surprisingly discovered that polyesters of this type are characterised by high performance in use, being capable of imparting high values of toughness to products obtained therewith, showing higher elongation at failure values associated with an increase, or at least a maintenance of, the tensile strength values, in comparison with products comprising polyesters in which the dicarboxylic component consists of other aliphatic diacids.

2-methylglutaric acid exists in two enantiomeric forms, (R)2-methylglutaric acid and (S)2-methylglutaric acid. Both enantiomeric forms (R) and (S) and their racemic mixture may be used in the polyesters according to this invention.

As far as the polyesters according to this invention are concerned, these may be both aliphatic and aliphatic-aromatic.

As far as the aliphatic polyesters are concerned, these comprise an aliphatic dicarboxylic component and an aliphatic diol component while the aliphatic-aromatic polyesters have a dicarboxylic component comprising polyfunctional aromatic acids and aliphatic diacids having aliphatic diol components.

Preferably the dicarboxylic component of aliphatic polyesters according to this invention comprises at least 20% in moles of 2-methylglutaric acid in comparison with the total moles of the dicarboxylic component and up to 80% in moles of at least a second linear saturated aliphatic diacid advantageously selected from the group consisting of oxalic acid, malonic acid, succinic acid, glutaric acid, adipic acid, pimelic acid, suberic acid, azelaic acid, sebacic acid, undecandioic acid, dodecandioic acid or brassilic acid and mixtures thereof, in comparison with the total moles of the dicarboxylic component.

In a particularly preferred embodiment the dicarboxylic component of the aliphatic polyesters comprises diacids obtained from raw materials of renewable origin, thus contributing to reducing the use of non-renewable resources such as for example raw materials of fossil origin.

In the meaning of this invention products obtained from sources which, because of their intrinsic characteristics are regenerated in nature or cannot be exhausted on the scale of a human lifetime and, by extension, whose use will not prejudice natural resources for future generations, are regarded as being of renewable origin. The use of products of renewable origin also contributes to reducing $CO_2$ in the atmosphere and reducing the use of non-renewable resources. A typical example of renewable sources comprises plant crops.

The dicarboxylic component of aliphatic polyesters according to this invention may also contain up to 10% in moles of diacids having unsaturations in the chain, such as for example itaconic acid and maleic acid, in comparison with the total moles of dicarboxylic component.

As far as the polyesters of the aliphatic-aromatic type according to this invention are concerned, the polyfunctional aromatic acids may be for example selected form dicarboxylic aromatic compounds of the type of phthalic acid and its esters, preferably terephthalic acid, and heterocyclic dicarboxylic aromatic compounds and their esters, preferably 2,5-furandicarboxylic acid. Preferably these heterocyclic dicarboxylic aromatic compounds are obtained from raw materials of renewable origin, thus contributing to reducing the use of non-renewable resources such as for example raw materials of fossil origin.

The aromatic aliphatic polyesters may be selected from (A) polyesters comprising repetitive units deriving from aromatic acids of the phthalic acid, aliphatic diacid and aliphatic diol type (AAPE-A), characterised by an aromatic units content between 35-60% in moles, preferably comprising between 40-55% in moles in comparison with the total moles of the dicarboxylic component.

(B) Polyesters comprising repetitive units deriving from heterocyclic dicarboxylic aromatic compounds, aliphatic diacids and aliphatic diols (AAPE-B), characterised by an aromatic units content of between 50-85% in moles, preferably between 60-75% in moles with respect to the total moles of the dicarboxylic component.

Particularly preferred are also aliphatic-aromatic polyesters in which the aromatic acids with multiple functional groups comprise mixtures of dicarboxylic aromatic compounds of the phthalic acid type and heterocyclic dicarboxylic aromatic compounds in which the heterocyclic dicarboxylic aromatic compounds preferably comprise 1-99%, preferably 5-95% and more preferably 20-90% in moles with respect to the total moles of aromatic acids having multiple functional groups.

The aliphatic dicarboxylic component of the polyesters of the aliphatic-aromatic type according to this invention preferably comprises at least 30% and more preferably at least 50% of 2-methylglutaric acid in moles, with respect to the total moles of the aliphatic dicarboxylic component, and up to 70% and more preferably up to 50% in moles, with respect to the total moles of the aliphatic dicarboxylic component, of at least a second linear saturated aliphatic diacid, for example selected from the group consisting of oxalic acid, malonic acid, succinic acid, glutaric acid, adipic acid, pimelic acid, suberic acid, azelaic acid, sebacic acid, undecandioic acid, dodecandioic acid and brassilic acid and mixtures thereof.

In a particularly preferred embodiment the dicarboxylic component of the aliphatic-aromatic polyesters comprises aliphatic diacids obtained from raw materials of renewable origin, thus contributing to reducing the use of non-renewable resources such as for example raw materials of fossil origin.

The dicarboxylic component of the aliphatic-aromatic polyesters according to this invention may also contain 10% in moles of diacids having unsaturations in the chain such as for example itaconic acid and maleic acid in relation to the total moles of the dicarboxylic component.

As far as the diol component of the polyesters according to this invention is concerned, this comprises at least one dihydroxyl compound selected from alkane diols having the formula $C_nH_{2n}(OH)_2$ in which "n" lies between 2 and 14, $C_5$-$C_{10}$ cycloalkandiols, diols comprising heterocyclic rings and their mixtures. Advantageously the said hydroxyl compound is selected from 1,2-ethandiol, 1,2-propandiol, 1,3-propandiol, 1,4-butandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tridecandiol, 1,4-cyclohexandimethanol, neopentylglycol, 2-methyl-1,3-propandiol, dianhydrosorbitol, dianhydromannitol, dianhydroiditol, cyclohexandiol and their mixtures. Of these, 1,4-butandiol, 1,3-propandiol and 1,2 ethandiol and their mixtures are particularly preferred. In a preferred embodiment the diol component comprises at least 85% in moles of 1,4-butandiol in relation to the total moles of the diol component.

The polyesters according to this invention may also comprise repetitive units deriving from at least one hydroxy acid in a quantity between 0-49% and preferably between 0-30% in moles in relation to the total moles of the dicarboxylic component. Examples of convenient hydroxy acids are glycolic acid, hydroxybutyric acid, hydroxycaproic acid, hydroxyvaleric acid, 7-hydroxyheptanoic acid, 8-hydroxycaproic acid, 9-hydroxynonanoic acid, lactic acid or lactides. The hydroxy acids may be inserted into the chain as such or may also be first caused to react with diacids or diols.

Long molecules having two functional groups, including functional groups not in the terminal position, may also be added in quantities not exceeding 10% in moles in relation to the total moles of dicarboxylic component. Examples are acid dimers, ricinoleic acid and acids incorporating epoxy groups and also polyoxyethylenes having a molecular weight between 200 and 10,000.

Diamines, amino acids and amino alcohols may also be present in percentages up to 30% in moles in relation to the total moles of the dicarboxylic component.

In the process of preparing the polyesters according to the invention one or more molecules having multiple functional groups may advantageously be added in quantities between 0.1 and 3% in moles in relation to the total moles of the dicarboxylic component (and any hydroxy acids) in order to obtain branched products. Examples of these molecules are glycerol, pentaerythritol, trimethylolpropane, citric acid, dipentaerythritol, monoanhydrosorbitol, monoanhydromannitol, acid triglycerides, polyglycerols, etc.

The molecular weight $M_n$ of the polyesters according to this invention is preferably greater than 30,000. As far as the polydispersity index of the molecular weights Mw/Mn is concerned, this instead preferably lies between 1.5 and 10, more preferably between 1.6 and 5, and even more preferably between 1.8 and 2.5.

The molecular weights $M_n$ and $M_w$ may be measured using Gel Permeation Chromatography (GPC). The determination may be performed with the chromatography system held at 40° C., using a set of three columns in series (particle diameter 5μ and porosities of 500 A, 1000 A and 10,000 A respectively), a refractive index detector, chloroform as eluent (flow 1 ml/min) and using polystyrene as the reference standard.

When used for applications typical of plastics materials (such as for example film blowing, injection moulding, expanded products, etc.) the Melt Flow Rate (MFR) of the polyesters according to this invention is typically between 500 and 1 g/10 min, for example between 100 and 5 g/10 min and between 70 and 10 g/10 min (measurement made at 190° C./2.16 kg according to standard ASTM D1238-89 "Standard Test Method for Melt Flow Rates of Thermoplastics by Extrusion Plastometer").

Typically, the polyesters according to the invention have an inherent viscosity of more than 0.4 (measured using an Ubbelohde viscometer for solutions in $CHCl_3$ having a concentration of 0.2 g/dl at 25° C.), preferably between 0.4 and 2, more preferably between 0.5 and 1.5 dl/g.

Unlike the situation for other aliphatic dicarboxylic acids, such as for example adipic acid, the preparation of polyesters comprising 2-methylglutaric acid has the unexpected advantage that it does not give rise to the formation of solid cyclic oligomers at ambient temperature. This is particularly advantageous because these solid cyclic oligomers frequently cause clogging of the vacuum systems used during the polycondensation stage, thus requiring particular precautions which have an adverse effect on its productivity to be adopted during the process.

In processes for the preparation of polyesters comprising repetitive units comprising a dicarboxylic component and a diol component the use of 2-methylglutaric acid is therefore extremely advantageous in that it renders the said processes more efficient and more simple to operate in comparison with polymerisation processes using other dicarboxylic acids.

It will also be noted that this advantageous use of 2-methylglutaric acid in processes for the preparation of polyesters is also encountered when this acid is used in only partial replacement of other aliphatic diacids. This aspect is particularly important for example in processes for the preparation of polyesters in which the dicarboxylic component comprises adipic acid. In fact, in these processes, the replacement of at least 30% and at least 40% in moles of adipic acid with 2-methylglutaric acid makes it possible to obtain polyesters having equivalent toughness characteristics and even greater values of elongation at failure, in addition to simplifying the process through the effect of reducing the formation of cyclic oligomers that are solid at ambient temperature.

This invention therefore also relates to a process for the production of polyesters through the reaction of a dicarboxylic component and a diol component in which the dicarboxylic component comprises at least 30%, and preferably at least 40% in moles of 2-methylglutaric acid in relation to the total moles.

In particular these polyesters may advantageously be obtained through a polycondensation reaction. Advantageously the process for the polymerisation of polyesters may be carried out in the presence of a suitable catalyst. Suitable catalysts which may be mentioned by way of example are organometallic compounds of tin, for example derivatives of stannoic acid, titanium compounds, for example orthobutyl titanate, aluminium compounds, for example Al-triisopropyl, and compounds of antimony and zinc.

The polyesters according to this invention may also be obtained through a reactive extrusion process from a polyester precursor (PP) comprising repetitive units formed of a dicarboxylic component and a substantially linear diol component having an MFI of 5-30 dl/g at 190° C. and 2.16 kg, a mean rated molecular weight $M_w$ measured by GPC of between 60,000 and 120,000 and a content of active sites such as unsaturations in a quantity of 0.1-1% in moles and/or terminal acid groups in quantities of 10-200 meq of KOH, the said reactive extrusion process being performed through the addition of a compound selected from peroxides, epoxides or carbodiimides such as those described above.

If the said reactive extrusion process is performed using peroxides, these are used in quantities of 0.001-0.2% and preferably 0.01-0.1% by weight with respect to the sum of the polymers fed to the reactive extrusion process.

As far as the addition of epoxides is concerned, these are preferably used in quantities of 0.1-2%, more preferably 0.2-1% by weight respect to the sum of the polymers fed to the reactive extrusion process.

If carbodiimides are used, these are preferably used in quantities of 0.05-2%, more preferably 0.1-1% by weight with respect to the sum of the polymers fed to the reactive extrusion process.

It is also possible to use mixtures of the said peroxides, epoxides and carbodiimides.

Preferably the said precursor polyester PP has an MFI of 5-30 and more preferably 7-20 g/10 in at 190° C. and 2.16 kg, a shear viscosity of 400-900 Pas and a mean rated molecular weight Mw of preferably between 100,000 and 130,000.

Preferably the said precursor polyester PP has an unsaturations content of 0.1-0.8% and more preferably 0.2-0.7% in moles with respect to the moles of the repetitive units of precursor polyester PP.

The unsaturations may be generated in situ during the polymerisation stage or working of the precursor polyester PP, or through the insertion of suitable unsaturated or terminal monomers having unsaturated chains.

Precursor polyesters PP having terminal unsaturations are particularly preferred.

Among the unsaturated chain terminators, those preferred are those having the following structure:

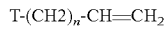

T-(CH2)$_n$-CH=CH$_2$ in which "T" is a group capable of reacting with carboxyl and/or hydroxyl groups, for example a hydroxyl, carboxyl, amine, amide or ester group, and "n" is a whole number of between 0 and 13.

The said unsaturated chain terminators may also be used as a mixture.

As far as "T" is concerned, this is preferably a hydroxyl or carboxyl group.

The whole number "n" preferably lies between 1 and 13, more preferably between 3 and 13 and is even more preferably 8 or 9.

Particularly preferred unsaturated chain terminators are omega-undecanoic acid, omega-undecenyl alcohol and their mixtures.

The presence of unsaturations and/or adducts deriving from their reaction after reactive extrusion may be determined by different methods well known to those skilled in the art, such as NMR spectroscopy, or by means of methanolysis reactions of the polymer chain coupled with chromatographic methods combined with mass spectrometry.

Those skilled in the art will easily be able to identify the structures relating to both the unsaturations as such and the adducts deriving from their reaction after reactive extrusion.

As far as measurement of the unsaturations content by NMR is concerned, this may be performed by H1 NMR 300 MHz using a pulse-acquisition sequence characterised by a pulse phase of 30°, a spectral amplitude=4 kHz, a delay of 5 seconds and performing 6000 scans. Preferably, the polyesters according to this invention can be obtained by a reactive extrusion process from a precursor polyester PP having a terminal acid groups content amounting to 35-150 meq of KOH/kg of polyester.

The terminal acid groups content must be measured in the following way: 1.5-3 g of polyester are placed in a 100 ml flask together with 60 ml of chloroform. After the polyester has completely dissolved 25 ml of 2-propanol are added, together with 1 ml of deionised water immediately prior to analysis. The solution so obtained is titrated with a previously standardised solution of KOH in ethanol. An appropriate indicator, such as for example a glass electrode for acid-base titrations in non-aqueous solvents, is used to determine the end point of the titration. The terminal acid groups content is calculated on the basis of the consumption of the KOH in ethanol solution using the following equation:

$$\text{Terminal acid groups content (meq KOH/kg polymer)} = \frac{\lfloor (V_{eq} - V_b) \cdot T \rfloor \cdot 1000}{P}$$

in which: $V_{eq}$=ml of KOH solution in ethanol at the end point of the titration of the sample;
$V_b$=ml of KOH solution in ethanol necessary to achieve pH=9.5 in the blank titration;
T=concentration of the KOH solution in ethanol expressed in moles/litre;
P=weight of the sample in grams.

The process for the production of precursor polyester PP may take place according to the process for the preparation of polyesters described above.

Preferably the polyesters according to this invention are biodegradable. In the meaning of this invention, by biodegradable polymers are meant polymers which are biodegradable according to standard EN 13432.

The polyesters according to the invention may be used in a mixture with one or more polymers of synthetic of natural origin, which may or may not be biodegradable, which may also be obtained through reactive extrusion processes.

In particular, the polyesters according to the invention may be used in mixtures with biodegradable polyesters of the diacid-diol type, from hydroxy acid or of the polyester-ether type.

As far as the said biodegradable polyesters of the diacid-diol type are concerned, these may be either aliphatic or aliphatic-aromatic.

The biodegradable aliphatic polyesters from diacid-diol comprise aliphatic diacids and aliphatic diols, whereas the biodegradable aliphatic-aromatic polyesters have an aromatic part comprising aromatic acids with multiple functional groups, an aliphatic part comprising aliphatic diacids and aliphatic diols.

The biodegradable aliphatic aromatic polyesters from diacid-diol are preferably characterised by a content of aromatic acids having multiple functional groups of between 30 and 90% in moles, and preferably between 45 and 70% in moles in relation to the total moles of the acid component.

Preferably the aromatic acids having multiple functional groups are selected from aromatic dicarboxylic compounds of the type of phthalic acid and its esters, preferably terephthalic acid, and heterocyclic dicarboxylic aromatic acids and their esters, preferably 2,5-furandicarboxylic acid. In a particularly preferred embodiment the said heterocyclic dicarboxylic aromatic compounds are obtained from raw materials of renewable origin, thus contributing to reducing the use of non-renewable resources such as for example raw materials of fossil origin.

Aliphatic-aromatic polyesters in which the aromatic acids having multiple functional groups comprise mixtures of dicarboxylic aromatic compounds of the phthalic acid type and heterocyclic dicarboxylic aromatic compounds in which the heterocyclic dicarboxylic aromatic compounds preferably comprise 1-99%, preferably 5-95% and more preferably 20-90% in moles in relation to the total moles of aromatic acids having multiple functional groups are particularly preferred.

The aliphatic diacids of biodegradable aliphatic and aliphatic-aromatic polyesters comprise saturated dicarboxylic acids such as oxalic acid, malonic acid, succinic acid, glutaric acid, adipic acid, pimelic acid, suberic acid, azelaic acid, sebacic acid, undecanoic acid, dodecanoic acid and brassilic acid, their esters and their mixtures. Of these adipic acids and dicarboxylic acids from renewable sources are preferred, among the latter dicarboxylic acids from renewable sources such as succinic acid, sebacic acid, azelaic acid, undecandioic acid, dodecandioic acid and bras silic acid and their mixtures are particularly preferred.

Examples of aliphatic diols in the biodegradable aliphatic and aliphatic-aromatic polyesters from diacid/diol are: 1,2-ethandiol, 1,2-propandiol, 1,3-propandiol, 1,4-butandiol, 1,5-pentandiol, 1,6-hexandiol, 1,7-heptandiol, 1,8-octandiol, 1,9-nonandiol, 1,10-decandiol, 1,11-undecandiol, 1,12-dodecandiol, 1,13-tridecandiol, 1,4-cyclohexandimethanol, neopentylglycol, 2-methyl-1,3-propandiol, dianhydro sorbitol, dianhydromannitol, dianhydroiditol, cyclohexandiol, cyclohexanmethandiol and their mixtures. Of these, 1,4-butandiol, 1,3-propandiol and 1,2-ethandiol and their mixtures are particularly preferred.

Preferably, the mixtures of polyesters according to the invention with biodegradable aliphatic and aliphatic-aromatic polyesters from diacid-diol described above are characterised by a biodegradable polyesters content which varies within the range from 1 to 99% by weight, more preferably between 5 and 95% by weight in relation to the sum of the weights of the copolyester according to the invention and the latter respectively.

It is also possible to mix the polyesters according to the invention with more than one biodegradable polyester of the diacid-diol type. Both binary and ternary mixtures of polyesters according to this invention with the said biodegradable polyesters from diacid-diol are particularly preferred.

The preferred biodegradable polyesters from hydroxy acid include: poly-L-lactic acid, poly-D-lactic acid and the poly-D-L-lactic stereo complex, poly-ε-caprolactone, polyhydroxy butyrate, polyhydroxy butyrate-valerate, polyhydroxy butyrate-propanoate, polyhydroxy butyrate-hexanoate, polyhydroxy butyrate-decanoate, polyhydroxy butyrate-dodecanoate, polyhydroxy butyrate-hexadecanoate, polyhydroxy butyrate-octadecanoate, poly-3-hydroxy butyrate-4-hydroxybutyrate.

Preferably the mixtures of polyesters according to the invention with the biodegradable polyesters of hydroxy acid described above are characterised by a content of the said biodegradable polyesters which varies within the range from 1 to 99% by weight, more preferably between 5 and 95% by weight in relation to the sum of the weights of the polyesters according to the invention and the latter respectively.

The polyesters according to this invention may also be used in a mixture with polymers of natural origin such as for example starch, cellulose, chitin, chitosan, alginates, proteins such as gluten, zein, casein, collagen, gelatin, natural gums, rosinic acids and their derivatives, lignins as such, purified, hydrolysed, basified, etc., lignins or their derivatives. The starches and celluloses may be modified and among these mention may for example be made of starch or cellulose esters having a degree of substitution between 0.2 and 2.5, hydroxypropylate starches, starches modified with fatty chains, and cellophane. Mixtures with starch are particularly preferred. The starch may also be used in both destructured or gelatinised form or as filler. The starch may comprise the continuous or the dispersed phase or may be in a co-continuous form. In the case of dispersed starch, the starch is preferably in a form smaller than one micron and more preferably smaller than 0.5 μm in mean diameter.

Preferably the mixtures of polyesters according to this invention with the polymers of natural origin described above are characterised by a content of the said polymers of natural origin which varies within the range from 1 to 99% by weight, more preferably between 5 and 95% by weight and more preferably between 10 and 40% by weight in relation to the sum of the weights of the polyesters according to the invention and the latter respectively.

The polyesters according to the invention may also be used in mixtures with polyolefins, aromatic polyesters, polyester- and polyether-urethanes, polyurethanes, polyamides, polyamino acids, polyethers, polyureas, polycarbonates and mixtures thereof.

Among the polyolefins, those preferred are: polyethylene, polypropylene, their copolymers, polyvinyl alcohol, polyvinyl acetate, polyethylvinyl acetate and polyethylenevinyl alcohol.

Among the aromatic polyesters, those preferred are: PET, PBT, PTT in particular having a renewables content of >30% and polyalkylene furan dicarboxylates. Among the latter those particularly preferred are polyethylene furan dicarboxylate, polypropylene furan dicarboxylate, polybutylene furan dicarboxylate and their mixtures.

Examples of polyamides are: polyamide 6 and 6,6, polyamide 9 and 9,9, polyamide 10 and 10,10, polyamide 11 and 11,11, polyamide 12 and 12,12 and their combinations of the 6/9, 6/10, 6/11, 6/12 type.

The polycarbonates may be polyethylene carbonates, polypropylene carbonates, polybutylene carbonates and their mixture and copolymers.

The polyethers may be polyethylene glycols, polypropylene glycols, polybutylene glycols, their copolymers and their mixtures having molecular weights from 70,000 to 500,000.

Preferably the mixtures of polyesters according to this invention with the polymers described above (polyolefins, aromatic polyesters, polyester- and polyether-urethanes, polyurethanes, polyamides, polyamino acids, polyethers, polyureas, polycarbonates and mixtures thereof) are characterised by a content of the said polymers which varies within the range between 0.5 and 99% by weight, more preferably between 5 and 50% by weight in relation to the sum of the weights of the polyesters according to the invention and the latter respectively.

The polyesters according to the invention are particularly suitable for use, alone or in a mixture with other polymers, in many practical applications for the manufacture of products such as for example films, fibres, non-woven fabrics, sheets, moulded articles, thermoformed articles, blow-moulded articles and expanded articles and laminated articles, including using the technique of extrusion coating.

Examples of products comprising polyesters according to this invention are:
- films, both mono- and bi-orientated, and multilayer films with other polymer materials;
- films for use in the agricultural sector as mulching films;
- extensible and even cling films for foodstuffs, for bales in agriculture and for wrapping wastes,
- bags and linings for the collection of organic materials such as the collection of food wastes and grass cuttings;
- both monolayer and multilayer thermoformed food packaging such as for example containers for milk, yoghourt, meat, beverages, etc.;
- coatings obtained using the technique of extrusion coating;
- multilayer laminates with layers of paper, plastics materials, aluminium, metallised films;
- expanded or expandable beads for the production of parts formed by sintering;
- expanded and semi-expanded products including expanded blocks formed from pre-expanded particles;
- expanded sheets, thermoformed expanded sheets, containers obtained therefrom for food packaging;
- containers in general for fruit and vegetables;
- compounds with gelatinised, destructured and/or complexed starch, natural starch, flours, other fillers of natural, plant or inorganic origin, as fillers;
- fibres, microfibres, composite fibres with a core comprising rigid polymers such as PLA, PET, PTT, etc., and an outer shell of the material according to the invention, dablens composite fibres, fibres having various cross-sections from round to multilobate, flock fibres, woven and non-woven or spun-bonded or thermobonded fabrics for the sanitary, health, agriculture and clothing sectors.

It may also be used in applications as a replacement for plasticized PVC.

The invention will now be illustrated through some example embodiments which are to be understood to be by way of example and not restricting the scope of protection of this patent application.

EXAMPLE 1

Synthesis of poly(butylene phthalate-r-butylene sebacate-butylene-2-methyl glutarate)

The following were placed in a 1 litre glass reactor having two necks, fitted with a stirrer, a nitrogen source and a water coolant connected to a test tube for the collection of distillates:

| | |
|---|---|
| Terephthalic acid: | 59.4 g |
| 2-methylglutaric acid | 37 g |
| 1,4-butandiol | 90 g |
| Sebacic acid | 17.8 g |

Esterification Stage

The reactor was immersed in an oil bath thermostatted at a temperature of 180° C. maintaining stirring at 400 rpm.

Distilled water was added during the reaction. The distillation was allowed to proceed for 30 minutes, after which 100 ppm of tetraorthobutyl titanate (Tyzor® TnBT marketed by Dorf Ketal) was added as esterification catalyst and the temperature of the oil bath was gradually increased to 235° C. The reaction was caused to continue until a conversion of >95% was obtained, calculated as the ratio between the quantity of distillates recovered during the reaction and the quantity which could be theoretically obtained.

Polycondensation Stage

The water cooling agent was subsequently replaced with an air coolant provided with a tapering graduated test tube for the collection of distillates, and a further 700 ppm of Tyzor® TnBT was added as a polycondensation catalyst. The pressure was reduced to 1 mbar over a time of approximately 10 minutes.

The reaction was continued for 4 hours, raising the oil temperature of 245° C.

At ambient temperature no solid oligomers were formed in the vacuum systems during the polycondensation stage.

A product having an inherent viscosity of 0.49 dl/g (measured in chloroform at 25° C. in solutions of concentration 0.2 g/dl in the manner specified by standard ASTM D 2857-89) was obtained.

The product was analysed using a Perkin Elmer DSC7 scanning differential calorimeter obtaining the following results:

$T_m = 131.5°$ C., $\Delta H_f = 18.9$ J/g

The mechanical properties of the polymer were then characterised (Table 1).

COMPARISON EXAMPLE 1

Synthesis of poly(butylene terephthalate-r-butylene sebacate-butylene adipate).

The following were placed in a 1 litre glass reactor having two necks fitted with a Teflon helical stirrer, a nitrogen source and a water coolant connected to a test tube for the collection of distillates:

| | |
|---|---|
| Terephthalic acid: | 59.4 g |
| Adipic acid | 37 g |
| 1,4-butandiol | 90 g |
| Sebacic acid | 17.8 g |

Esterification Stage

The reactor was immersed in an oil bath thermostatted to the temperature of 180° C. maintaining stirring at 400 rpm.

Distilled water was added during the reaction. Distillation was allowed to proceed for 30 minutes after which 100 ppm of tetraorthobutyl titanate (Tyzor® TnBT marketed by Dorf Ketal) was added as an esterification catalyst and the temperature of the oil bath was gradually increased to 235° C. The reaction was caused to continue until a conversion of >95% was obtained, calculated as the ratio between the quantity of distillates recovered during the reaction and the quantity theoretically obtainable.

Polycondensation Stage

Subsequently the water coolant was replaced by an air coolant fitted with a tapering graduated test tube for the collection of distillates, and a further 700 ppm of Tyzor® TnBT was added as polycondensation catalyst. The pressure was reduced to 1 mbar over a time of approximately 10 minutes.

The reaction was continued for 4 hours, raising the oil temperature to 245° C.

Solid oligomers formed at ambient temperature in the vacuum system during the polycondensation stage.

A product having an inherent viscosity of 0.49 dl/g (measured in chloroform at 25° C. in solutions of concentration 0.2 g/dl, in the manner specified by standard ASTM D 2857-89) was obtained.

The product was analysed by Perkin Elmer DSC7 scanning differential calorimeter, obtaining the following results:

$T_m$=130° C., $\Delta H_f$=19.5 J/g

The mechanical properties of the polymer were then characterised (Table 1).

TABLE 1

Dumbbell type V mechanical properties according to standard ASTM D638-89

| | Example 1 | Comparison example 1 |
|---|---|---|
| Tensile strength (MPa) | 9.3 | 8.6 |
| Elongation at failure (%) | 470 | 100 |
| Apparent modulus (MPa) | 75 | 91 |
| Energy at break (MJ/m$^3$) | 21 | 8.5 |

As shown from the above mechanical properties, the polyester according to Example 1 shows high values of toughness (Energy at break) associated to higher elongation at failure values and to an increase of the tensile strength values in comparison with the polyester according to Comparison Example 1 which comprises adipic acid instead of 2-methylglutaric acid.

The invention claimed is:

1. A polyester selected from aliphatic-aromatic polyesters having a dicarboxylic component comprising repeating units deriving from at least one polyfunctional aromatic acid of the phthalic acid type and at least one aliphatic diacid, and a diol component comprising repeating units deriving from at least one aliphatic diol, wherein said aliphatic diacid comprises a mixture consisting of at least 50% by moles, with respect to the total moles of the aliphatic dicarboxylic component, of 2-methylglutaric acid and up to 50% by moles, with respect to the total moles of the aliphatic dicarboxylic component, of at least one second linear aliphatic saturated diacids, and wherein the dicarboxylic component in the aliphatic-aromatic polyesters comprises 40-55% by moles, with respect to the total moles of the dicarboxylic component comprising polyfunctional aromatic acids and aliphatic diacids, of repeating units deriving from at least one polyfunctional aromatic acid of the phthalic acid type, wherein said polyester has an elongation at failure above 100% and an energy at break above 8.5 MJ/m$^3$.

2. The polyester according to claim 1, wherein said second linear aliphatic saturated diacid is selected from the group consisting of adipic acids, succinic acid, sebacic acid, azelaic acid, undecandioic acid, dodecandioic acid and brassilic acid and mixtures thereof.

3. The polyester according to claim 1, wherein said second linear aliphatic saturated diacid is selected from the group consisting of oxalic acid, malonic acid, succinic acid, glutaric acid, adipic acid, pimelic acid, suberic acid, azelaic acid, sebacic acid, undecandioic acid, dodecandioic acid, brassylic acid and mixtures thereof.

4. The polyester according to claim 1, wherein the at least one polyfunctional aromatic acid of the phthalic acid type is terephthalic acid.

5. A polymeric composition comprising the polyesters according to claim 1 and one or more polymers selected from polymers of synthetic and natural origin.

6. An article selected from the group of films, fibers, nonwoven fabrics, sheets, moulded articles, thermoformed articles, blown articles, foamed articles and laminated articles comprising the polyesters according to claim 1.

7. A polymeric composition comprising the polyesters according to claim 3 and one or more polymers selected from polymers of synthetic and natural origin.

8. An article selected from the group of films, fibers, nonwoven fabrics, sheets, moulded articles, thermoformed articles, blown articles, foamed articles and laminated articles comprising the polyesters according to claim 3.

\* \* \* \* \*